United States Patent
Johnson et al.

(10) Patent No.: US 11,014,761 B2
(45) Date of Patent: May 25, 2021

(54) CONVEYOR CONDITION MONITOR FOR A CONVEYOR WITH LINKED TROLLIES

(71) Applicant: Castrol Limited, Reading (GB)

(72) Inventors: Scott Alan Johnson, White Cloud, MI (US); Richard Allen Moen, White Cloud, MI (US); William Thomas Preble, White Cloud, MI (US)

(73) Assignee: Castrol Limited, Reading (GB)

( * ) Notice: Subject to any disclaimer, the term of this patent is extended or adjusted under 35 U.S.C. 154(b) by 0 days.

(21) Appl. No.: 16/311,677

(22) PCT Filed: Jun. 26, 2017

(86) PCT No.: PCT/IB2017/000917
§ 371 (c)(1),
(2) Date: Dec. 19, 2018

(87) PCT Pub. No.: WO2018/002708
PCT Pub. Date: Jan. 4, 2018

(65) Prior Publication Data
US 2019/0322462 A1    Oct. 24, 2019

Related U.S. Application Data

(60) Provisional application No. 62/354,911, filed on Jun. 27, 2016.

(51) Int. Cl.
*B65G 43/02*    (2006.01)
*B65G 17/38*    (2006.01)
(Continued)

(52) U.S. Cl.
CPC ............. *B65G 43/02* (2013.01); *B65G 17/38* (2013.01); *B65G 39/20* (2013.01); *B65G 47/60* (2013.01);
(Continued)

(58) Field of Classification Search
CPC ........ B65G 43/02; B65G 17/38; B65G 39/20; B65G 47/60; B65G 2203/0233; B65G 2203/042

See application file for complete search history.

(56) References Cited

U.S. PATENT DOCUMENTS

| 5,490,590 A | 2/1996 | Courtney |
| 5,563,392 A | 10/1996 | Brown et al. |

(Continued)

FOREIGN PATENT DOCUMENTS

| CA | 2 511 062 | 12/2006 | |
| CA | 2511062 A1 * | 12/2006 | ............. B65G 43/02 |

(Continued)

OTHER PUBLICATIONS

Anonymous: "Keeping watch Overhead for Conveyor Performance", Oct. 8, 2012, Retrieved from the Internet: URL:http://www.forgingmagazine.com/handling/stopping-disruptions-overhead [retrieved on Nov. 27, 2017].

*Primary Examiner* — Gene O Crawford
*Assistant Examiner* — Lester Rushin, III
(74) *Attorney, Agent, or Firm* — McDonnell Boehnen Hulbert & Berghoff LLP

(57) ABSTRACT

A conveyor condition monitor, for use with a conveyor comprising a plurality of trollies (12) running along a conveyor rail (14) and linked to one another by a chain link system, is disclosed. The monitor comprises a conveyor monitoring station (3) and a first deformation sensor (5a, 5b). The deformation sensor (5b) is in communication with the conveyor monitor, and is adapted to notify the conveyor monitor of the presence of a deformed (13b) trolley (12) in the conveyor.

42 Claims, 5 Drawing Sheets

(51) Int. Cl.
 *B65G 39/20* (2006.01)
 *B65G 47/60* (2006.01)
(52) U.S. Cl.
 CPC ............... *B65G 2203/0233* (2013.01); *B65G 2203/042* (2013.01)

(56) References Cited

U.S. PATENT DOCUMENTS

| | | | |
|---|---|---|---|
| 5,994,712 A * | 11/1999 | Mack ................... | G01N 21/894 |
| | | | 250/559.42 |
| 6,851,546 B2 | 2/2005 | Lodge | |
| 6,862,939 B2 | 3/2005 | Frost | |
| 6,993,978 B2 | 2/2006 | Frost | |
| 7,540,374 B2 | 6/2009 | Rathbun et al. | |
| 8,127,918 B2 * | 3/2012 | Warner ................. | B65G 43/02 |
| | | | 198/810.03 |
| 8,285,494 B2 | 10/2012 | Vozner | |
| 10,486,910 B2 * | 11/2019 | Kahrger ................ | B65G 21/08 |
| 2012/0186613 A1 * | 7/2012 | Siegmund .............. | B65G 17/38 |
| | | | 134/56 R |
| 2020/0277143 A1 * | 9/2020 | Bottini ................... | B65G 39/12 |
| 2020/0346874 A1 * | 11/2020 | Onishi ................... | B65G 43/02 |

FOREIGN PATENT DOCUMENTS

| | | | |
|---|---|---|---|
| JP | H10 300426 | | 11/1998 |
| JP | 2008 039708 | | 2/2008 |
| JP | 2008039708 | A * | 2/2008 |

\* cited by examiner

CONVEYOR CONDITION MONITOR FOR A CONVEYOR WITH LINKED TROLLIES

This application is a National Phase application of, and claims the benefit of, International (PCT) Application No. PCT/IB2017/000917, filed Jun. 26, 2017, which claims priority to U.S. Provisional Patent Application No. 62/354,911, filed Jun. 27, 2016, each of which is hereby incorporated by reference in its entirety.

FIELD

This invention relates to a conveyor condition monitor, in particular, for a conveyor comprising a plurality of trollies, a monitor adapted to detect the presence of deformed trollies.

BACKGROUND

Conveyors are used widely in both industrial and commercial settings for the transport of various articles from one place to another. In essence a conveyor is a looped system with a surface or retaining means on or in which articles are positioned and transported. The surface or retaining means run continuously around a track, and may transport articles along all or only part of the length of the track. One example is the so-called monorail conveyor or I-beam conveyor system, which typically comprise a number of trollies joined together by a number of chain links. The trollies are mounted on a beam having an "I"-shaped cross-section by means of wheels that run along the central part of the beam and are retained by one of the perpendicular cross portions of the "I". This forms the conveyor track, and may be in standard 3, 4, or 6 inch or corresponding metric track heights. Either the trollies form pendants hanging down from the conveyor track, and articles are transported along the conveyor by suspension from the trollies, or the chain engages with a carrier system mounted beneath the conveyor. The configuration is chosen based upon the weight of the articles being transported. For example, heavy objects will require their weight to be evenly distributed across a number of trollies, whereas lighter objects can be mounted on a single trolley.

In order for the conveyor system to work reliably and efficiently it is important that the trollies and chains are in good condition. Any form of deformation in a trolley, such as bent, stationary or missing wheels, bent arms, trollies that are loose and starting to come away from the chain, or trollies with any damaged, deformed or defective areas or components can potentially cause catastrophic damage to a conveyor and to articles being transported. In addition this can pose a health and safety risk to any personnel working in the vicinity of the conveyor, or for bystanders. Consequently, maintenance, additional inspection and repair can lead to unscheduled or increased downtime of the conveyor.

SUMMARY

It has been appreciated that real time inspection of a conveyor can help prevent unscheduled or increased downtime by highlighting the presence of deformed trollies. One aspect of the invention provides a conveyor condition monitor, the conveyor comprising a plurality of trollies running along a conveyor rail and linked to one another by a chain link system, comprising: a conveyor monitoring station; and a first deformation sensor; wherein the deformation sensor is in communication with the conveyor monitor, and wherein the deformation sensor is adapted to notify the conveyor monitor of the presence of a deformed trolley in the conveyor.

DETAILED DESCRIPTION

As mentioned above, it has been appreciated that real-time monitoring of a conveyor system to highlight and identify deformed trollies can be used to reduce the duration and frequency of conveyor downtime associated with the presence of deformed trollies.

Deformed trollies include those that have bent, stationary or missing wheels, bent arms, trollies that are loose and starting to come away from the chain, or trollies with any damaged, deformed or defective areas or components. Such a conveyor system will typically comprise a plurality of trollies running along a conveyor rail and linked to one another by a chain link system. A conveyor condition monitor can comprise a conveyor monitoring station and a first deformation sensor. This deformation sensor is in communication with the conveyor monitor, is adapted to notify the conveyor monitor of the presence of a deformed trolley in the conveyor. This ensures that any deformed trollies are highlighted and, as in the example below, may be identified to enable a rapid repair of the conveyor system to take place, thus minimising downtime.

Figure 1:
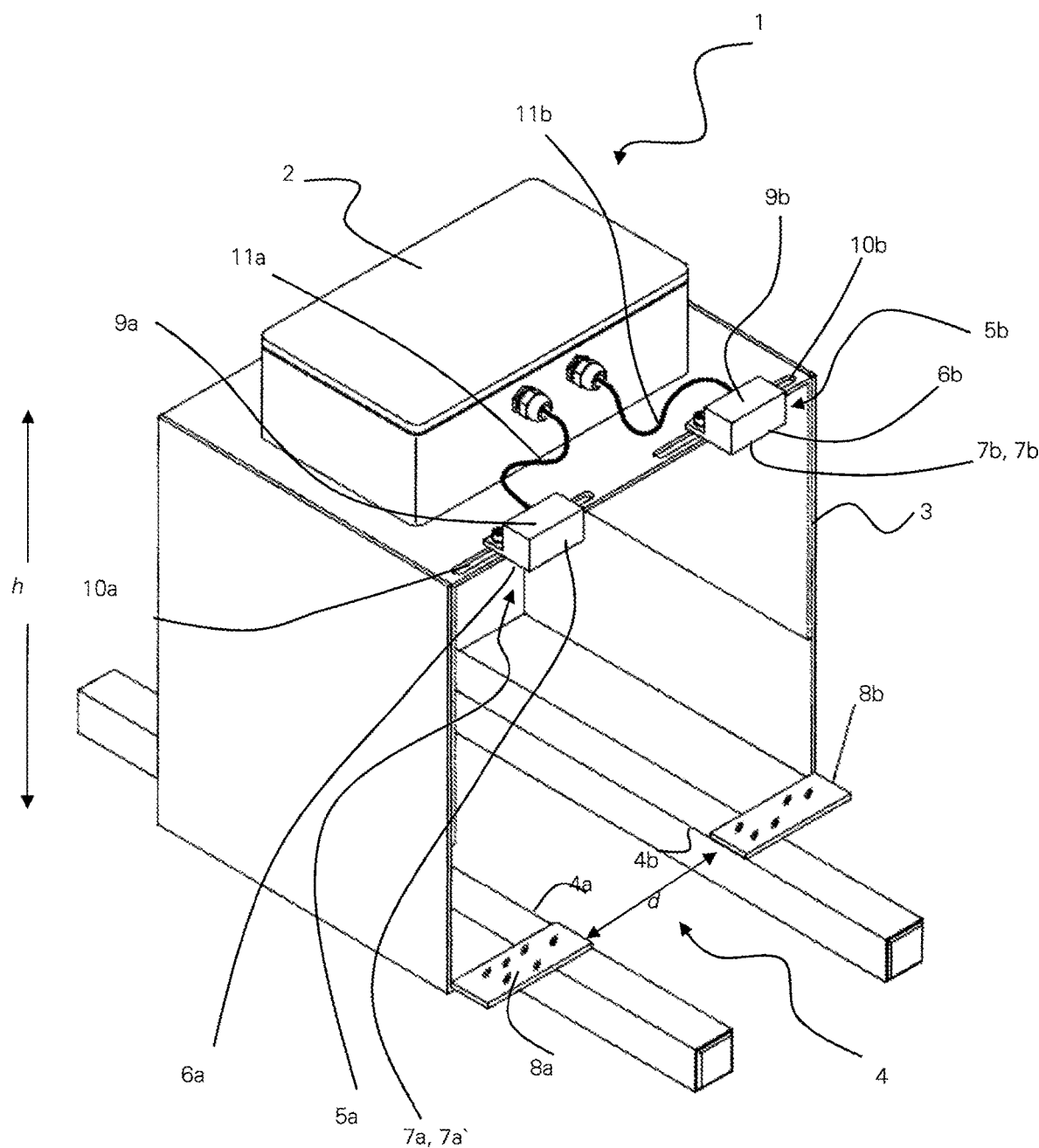
FIG. 1 is a schematic perspective view of a conveyor condition monitor in accordance with an embodiment of the invention.

FIG. 1 is a schematic perspective view of a conveyor condition monitor in accordance with an embodiment of the invention. The conveyor condition monitor 1 comprises a conveyor monitoring station 2 mounted on a housing 3. In this example, the conveyor (not shown) is a conveyor comprising a plurality of trollies linked together by a chain link system, enabling the trollies to run along a conveyor rail. The trollies are adapted to engage with the chain, and are individually removable from the conveyor. The housing 3 is mounted on the I-beam of the conveyor (not shown), has a height h and is provided with a gap 4, through which the trollies pass when running along the I-beam. The width of this gap between a first edge 4a and a second edge 4b is d, and must be wide enough to allow the trollies free passage without risk of jamming or damage. The trollies are mounted such that they pass through the housing 3, hence height h of the housing must be greater than the dimension of the portion of the trolley passing thought the housing 3. A first deformation sensor 5a is positioned on the housing 3 opposite the gap 4 and parallel to the first edge 4a of the gap 4, and a second deformation sensor 5b is positioned on the housing 3 opposite the gap 4 and parallel to the second edge 4b of the gap 4. Each of the deformation sensors 5a, 5b is in communication with the conveyor monitor. The deformation sensors 5a, 5b are adapted to notify the conveyor monitor of the presence of a deformed trolley in the conveyor. This is discussed in more detail below.

In order to indicate that a trolley is deformed the first 5a and second 5b deformation sensors are adapted to have a first state and a second state, the first state indicating that a trolley is not deformed and a second state indicating that a trolley is deformed. The first and second states must be clearly different and easily discernible to make the indication of the deformation as accurate as possible. The first 5a and the second 5b deformation sensors are arranged so as to be positionable symmetrically about the conveyor rail, such that the actual position of the deformation on the trolley is easily identifiable. The conveyor condition monitor 1 is positioned in the plane of the conveyor rail, and may be used regardless of the orientation of the conveyor rail to the ground—in other words the housing 3 may be any orientation with respect to the ground as long as the conveyor trolleys pass through the gap 4.

The first 5a and second 5b deformation sensors may be chosen from optical sensors, mechanical sensors, magnetic sensors, harmonic sensors and ultrasonic sensors. Each type of sensor offers different advantages, and may be particularly useful in different environments. FIG. 1 illustrates a particular type of optical sensor, but the simplest type of optical sensor is one where the deformed trolley interrupts a light beam or a light curtain, causing the deformation sensor to enter the second state. As shown in FIG. 1, each of the first 5a and second 5b deformation sensors comprises a light source 6a, 6b, an optical detector 7a, 7b arranged to detect light from the light source 6a, 6b; and a reflector 8a, 8b arranged to reflect light incident from the light source 6a, 6b towards the optical detector 7a, 7b. The light sources 6a, 6b and the detectors 7a, 7b are arranged, along with the conveyor monitoring station 2 on one side of the conveyor trolleys, with the reflectors 8a, 8b arranged on the opposite side of the conveyor trolleys. Each light source 6a, 6b is contained within a unit 9a, 9b along with an associated detector 7a, 7b, and the unit 9a, 9b is mounted on the housing 3. In order to provide an element of adjustability to enable the arrangement of the relevant components to give accurate and reliable data, a slot 10a, 10b is provided in the housing 3, either side of the gap 4, and the units 9a, 9b are mounted in an adjustable manner via the slot. One option is to use an adjustable screw fitting, which may be loosened and tightened as needed to position the light source 6a, 6b and optical detector 7a. 7b. A particularly effective arrangement is to use two optical detectors 7a, 7a', 7b, 7b' in each unit 9a, 9b, arranged symmetrically about respective light sources 6a, 6b such that the light sources 6a, 6b are each situated between two detectors 7a, 7a', 7b, 7b'. The light sources 6a, 6b and the reflectors 8a, 8b are arranged such that in the first state, the maximum amount of light emitted by the light sources 6a, 6b reaches the detectors 7a, 7b, and in the second state a portion of a trolley interrupts the light emitted by the light sources 6a, 6b, reducing the amount of light reaching the detectors 7a, 7b. The light sources 6a, 6b may be light emitting diodes (LEDs) or other suitable light sources. Although any region of the electromagnetic spectrum may be chosen as the light beam, using the infrared region of the electromagnetic spectrum gives acceptable accuracy and prevents any other lighting sources from giving false readings at the optical detectors 7a, 7b. The optical detectors 7a, 7b themselves may be photodiodes or other suitable detecting elements. The reflectors 8a, 8b are formed from infrared-reflecting materials with a flat or curved surface. The light sources 6a, 6b and the optical detectors 7a, 7a', 7b, 7b' are connected to the conveyor monitoring station 2 by means of cabling 11a, 11b running between the units 9a, 9b and the conveyor monitoring station 2.

Figure 2:
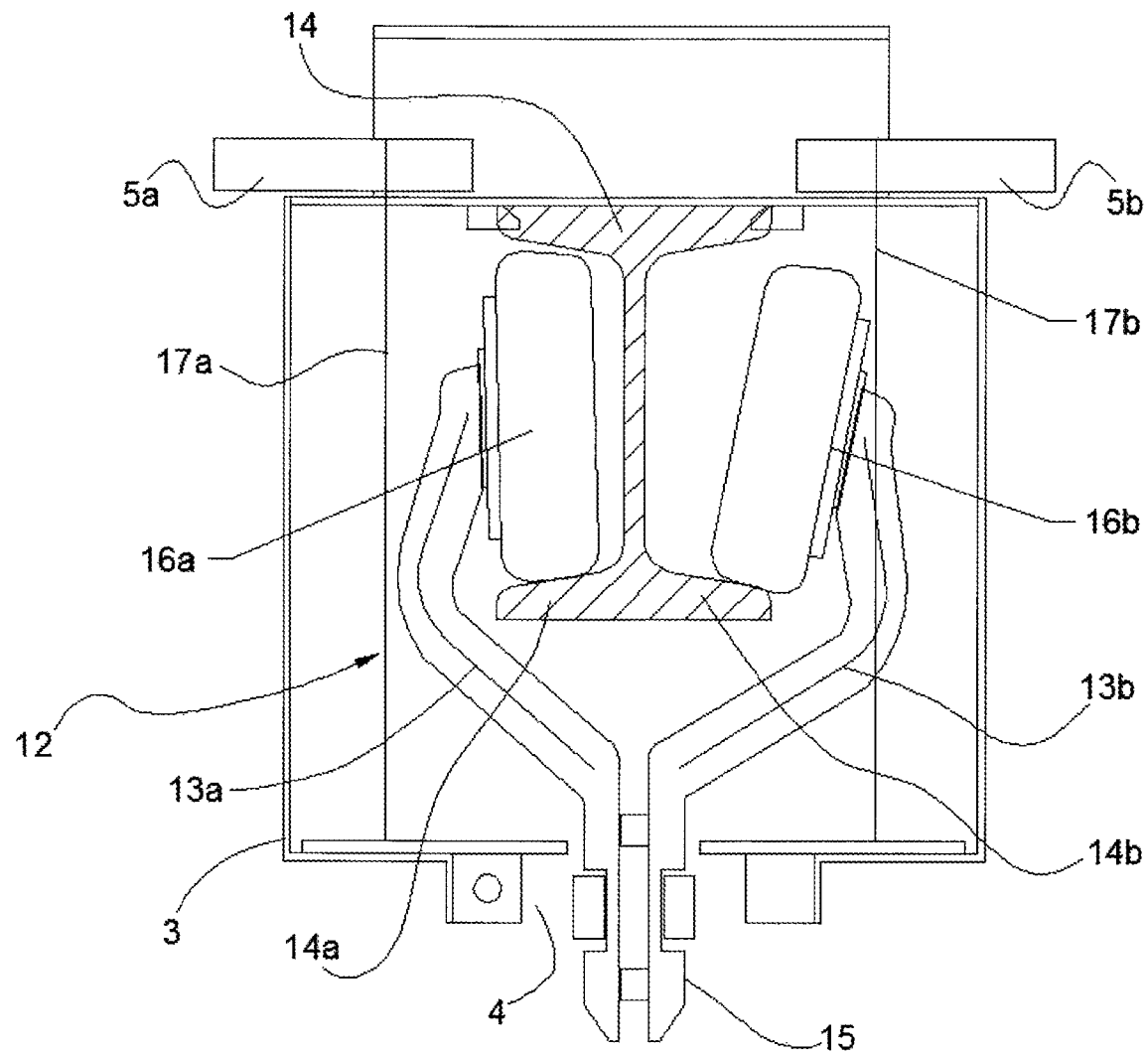
FIG. 2 is a schematic front view of a trolley illustrating a normal and a deformed condition.

FIG. 2 is a schematic front view of a trolley illustrating a normal and a deformed condition. The trolley 12 comprises a first arm 13a and a second arm 13b, arranged to be positioned symmetrically around the I-beam 14 of a conveyor, and joined where the trolley is adapted to be engaged with the chain 15. In use, base of the trolley 12 is used to suspend articles being conveyed by the conveyor, and must be able to pass freely through the gap 4 in the housing 3. Each of the first 13a and second 13b arm of the trolley 12 is provided with a first 16a and second 16b wheel respectively. In normal use (illustrated by the left-hand side of the trolley 12), the first wheel 16a engages with the I-beam 14, with the wheel 16a having an appropriate diameter to sit within the two cross-sections 14a, 14b of the I-beam 14. In this position the first light beam 17a provided by the first deformation sensor 5a is unbroken. When the trolley 12 is deformed (as illustrated by the right-hand side of the trolley 12) the second arm 13b is bent, causing the second wheel 16b to disengage with the I-beam 14 and interrupting the second light beam 17b from the second deformation sensor 513. Whilst the first light beam 17a is uninterrupted and therefore reflected by the first reflector 8a, the second light beam 17b does not reach the second reflector 8a, thus creating the second state where the conveyor monitoring station 2 is notified that there is a deformed trolley 12.

As discussed above, deformed trolleys include those that have bent, stationary or missing wheels, bent arms, trolleys that are loose and starting to come away from the chain, or trolleys with any damaged, deformed or defective areas or components. Only one arm 13a, 13b may be deformed, or both arms 13a. 13b may be deformed.

The amount by which a light beam 17a, 17b is interrupted can be used to estimate the amount of deformation of a trolley 12. If a light beam 17a, 17b is completely interrupted, this can indicate catastrophic deformation that requires the entire conveyor to be shut down immediately. Variations in the intensity of the reflected light detected by the optical detectors 7a, 7b may indicate levels of damage and/or action points in terms of inspection. A minimum acceptable reflectance may be chosen, below which the conveyor is stopped immediately, and above which the period before the next inspection is reduced. Other levels of reflectance may be used to determine maintenance schedules. A rapid change in reflectance may indicate a particular problem at some point on the conveyor, for example, a problem with the I-beam or surrounding infrastructure, and indicate that an inspection is necessary.

In the above example, an optical sensor arrangement with two light sources 6a, 6b, two/four optical detectors 7a, 7a', 7b, 7b' and two reflectors 8a, 8b are utilised. However, it may be desirable to use only a single light source and/or a single reflector and/or a single optical detector, depending on the type of conveyor or trolley being monitored. For example, a single light source may be used, along with a single optical detector, by employing either an arrangement of additional reflectors, lenses or beam splitters in the optical path of the light beam. Similarly, an arrangement of optical components may be used in conjunction with a single reflector or optical detector. Some types of optical sensor do not need to employ a reflector, for example, where the optical detector is arranged to detect the light beam directly. In the above arrangement this would lead to the optical detector being positioned on the housing 3 near the gap 4, and may be adjustable toward or away from the edges 4a, 4b of the gap 4. Any suitable light source, such as a laser, monochromatic or polychromatic (white) light bulb, may be used in place of the light emitting diodes illustrated above.

Figure 3A:
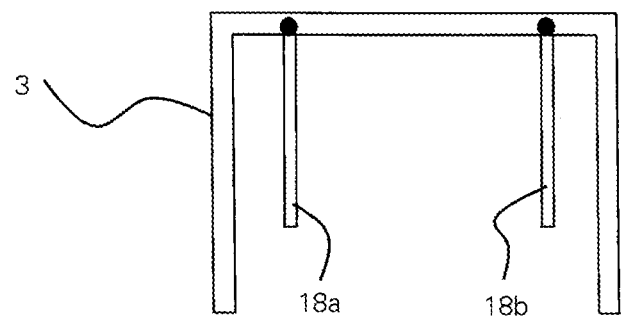
FIG. 3a is a schematic front view of a mechanical sensor arrangement for use in a conveyor condition monitor.

FIG. 3a is a schematic front view of a mechanical sensor arrangement for use in a conveyor condition monitor. In this example, rather than using optical sensors, mechanical sensors are used. In a first state, the mechanical sensor is undeflected, and in a second state the mechanical sensor is deflected, the first state indicating that a trolley is not deformed and a second state indicating that a trolley is deformed. This may be achieved by mounting the mechanical sensor on the housing 3 and adapting it to be deflected by a deformed trolley. Moveable arms 18a, 18b are moveable mounted onto the housing 3. Appropriate mounting mechanisms include rotatable mounting mechanisms (hinges, ball and socket joints), flexible mounting mechanisms (flexible hinges, living hinges), and resilient mounting mechanisms (sprung arms, springs in tension, springs in compression). Alternatively the moveable arms 18a, 18b, are formed at least in part from a flexible, resilient material, such as a thermoplastic, and bend to cause the deflection by the deformed trolley.

Figure 3B:
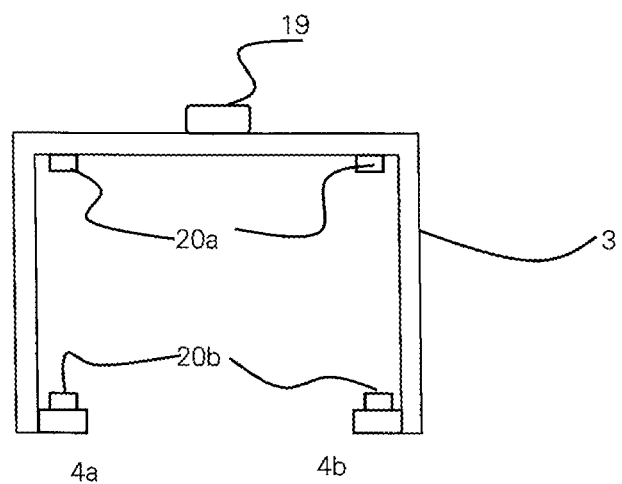
FIG. 3b is a schematic front view of an electrical sensor arrangement for use in a conveyor condition monitor.

FIG. 3b is a schematic front view of an electrical sensor arrangement for use in a conveyor condition monitor. In this example, the electrical sensor is an electrical circuit. In a first state, the electrical circuit is unbroken, and in a second state the electrical circuit is broken, the first state indicating that a trolley is not deformed and a second state indicating that a trolley is deformed. Suitable electrical circuit arrangements include capacitance circuits, where a power supply 19 is mounted on the housing 3 adjacent the conveyor monitoring station 2, a first capacitor plate 20a is also mounted on the housing 3 next to the conveyor monitoring station 2, and a second capacitor plate 20b is mounted on the housing 3 adjacent an edge 4a of the gap 4.

Figure 3C:
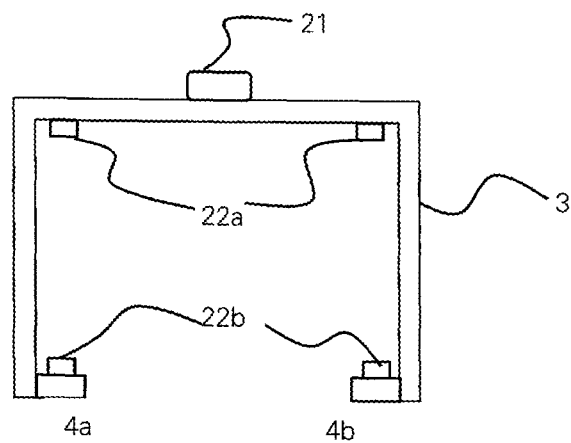
FIG. 3c is a schematic front view of a magnetic sensor arrangement for use in a conveyor condition monitor.

FIG. 3c is a schematic front view of a magnetic sensor arrangement for use in a conveyor condition monitor. In this example, the magnetic sensor is a magnetic field. In a first state, the magnetic field is continuous, and in a second state the magnetic field is interrupted, the first state indicating that a trolley is not deformed and a second state indicating that a trolley is deformed. Suitable arrangements include using an inductor to generate the magnetic field, where a power supply 21 is mounted on the housing 3 adjacent the conveyor monitoring station 2, a first inductor 22a is also mounted on the housing 3 next to the conveyor monitoring station 2, and a inductor 22b is mounted on the housing 3 adjacent an edge 4a of the gap 4.

Figure 3D:
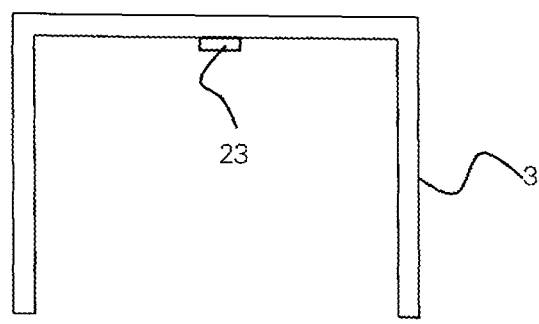
FIG. 3d is a schematic front view of a harmonic sensor arrangement for use in a conveyor condition monitor.

FIG. 3d is a schematic front view of a harmonic sensor arrangement for use in a conveyor condition monitor. A harmonic sensor 23 is mounted on the housing 3, and arranged to monitor the vibrations along the I-beam due to the engagement of the trolley wheels. The harmonic sensor 23 may be a single vibration sensor, an acoustic sensor or comprise a plurality of acoustic receivers positioned along the I-beam. The harmonic sensor is adapted to detect the vibrations of the wheels of a trolley. In a first state, vibrations of the wheels of a trolley are present, and in a second state the vibrations of the wheels of a trolley are reduced, the first state indicating that a trolley is not deformed and a second state indicating that a trolley is deformed. In this situation, when the trolley is deformed, a trolley wheel is bent, stationary or missing. Alternatively, in a first state, vibrations of the wheels of a trolley are present, and in a second state the vibrations of the wheels of a trolley are absent, the first state indicating that a trolley is present and a second state indicating that a trolley is missing.

Figure 3E:
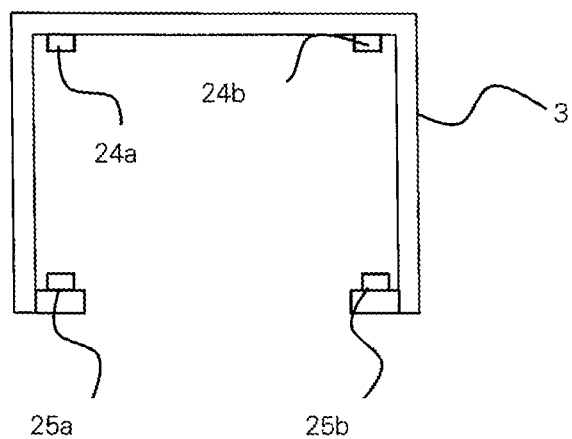
FIG. 3e is a schematic front view of an ultrasonic sensor arrangement for use in a conveyor condition monitor.

FIG. 3e is a schematic front view of an ultrasonic sensor arrangement for use in a conveyor condition monitor. In this example, the ultrasonic sensor is an ultrasonic transceiver device, capable of transmitting and receiving waves at ultrasonic frequencies. A first ultrasonic transceiver 24a is mounted on the housing 3 opposite the gap 4 and parallel to the first side of the gap 4a. A second ultrasonic transceiver 24b is mounted on the housing 3 opposite the gap 4 and parallel to the second side of the gap 4b. The ultrasonic transceivers 24a, 24b emit waves of an ultrasonic frequency that are reflected back by the portions of the housing 3 adjacent the first 4a and second 4b edges of the gap 4. Specific regions of materials having a known reflection/absorption coefficient for ultrasonic frequencies or the bare housing may be used as reflectors 25a, 25b to enable the ultrasonic transceivers 24a, 24b to receive reflected ultrasonic waves. In a first state, the ultrasonic waves emitted by the ultrasonic transceivers 24a, 24b are uninterrupted, and in a second state, the ultrasonic waves emitted by the ultrasonic transceivers 24a, 24b are interrupted, the first state indicating that a trolley is not deformed and a second state indicating that a trolley is deformed. Whether or not the ultrasonic waves are interrupted may be determined by the strength of the reflected signal and/or the time of flight of the reflected signal. For example, a weaker reflected signal or a change in the time of flight indicating that the signal path is shorter may be used to indicate that the ultrasonic waves have been interrupted. As an alternative to an ultrasonic transceiver, separate transmitters and receivers may be used, either in the same arrangement as shown in FIG. 3e, or with the receivers positioned adjacent the first 4a and second 4b edges of the gap 4. Consequently the receivers may detect reflected ultrasonic waves (as described above) or ultrasonic waves directly incident from the ultrasonic transmitters. In this situation there is no need to detect reflected ultrasonic waves.

Regardless of the type of deformation sensor used, the conveyor monitoring station 2 is adapted to sound an alarm if the deformation sensor is in the second state. This may be an audio and/or visual alarm. The conveyor condition monitor 1 may further an identification device adapted to identify an individual trolley in the conveyor. This may be by way of recognising a visual identification, such as a number or other visual marker provided on each trolley, or recognising a non-visual identification, such as a passive RFID tag. The conveyor condition monitor 1 ideally also includes a marking device adapted to mark an individual trolley in the conveyor. Marking may consist of providing a physical marker, such as a blob of paint or ink, a label or other self-adhesive sticker, with a printing device being particularly suitable.

In one example, the conveyor condition monitor 1 also comprises a notification device adapted to send a notification indicating the presence of a deformed trolley in the conveyer. Such notification includes a unique identifier for the trolley; and the position of the trolley in the conveyor. The notification itself may be an email, an SMS message, an MMS message, a text message, an automated voice message or a system notification.

In the above examples, the conveyor on which the conveyor condition monitor 1 is adapted for use on a monorail conveyor. However, suitable modifications to the housing 3 would enable the conveyor condition monitor 1 to be used on other types of conveyor. Other adaptions, such as changes to individual sensor constructions (reflectors, detector and sources) fall within the five groups of sensors described above. In addition, the conveyor condition monitor 1 may be combined with other monitoring systems, either as a stand-alone system or a system connectable to a network for communication with a remote client, server, or cloud server. These and other features of the invention will be apparent from the appended claims.

The invention claimed is:

1. Conveyor condition monitor coupled to a conveyor, the conveyor comprising a plurality of trollies running along a conveyor rail and linked to one another by a chain link system, comprising:
   a conveyor monitoring station; and
   a first deformation sensor comprising a light source, an optical detector configured to detect light from the light source, and a reflector configured to reflect light incident from the light source towards the optical detector, wherein the first deformation sensor is in communication with the conveyor monitoring station, wherein the first deformation sensor is configured to detect a deformed trolley among the plurality of trollies based on an amount of light detected by the optical detector, and wherein the first deformation sensor is configured to notify the conveyor monitoring station of the presence of the deformed trolley in the conveyor.

2. Conveyor condition monitor as claimed in claim 1, wherein the first deformation sensor is adapted to have a first state and a second state, the first state indicating that a trolley, among the plurality of trollies, is not deformed and a second state indicating that the trolley is deformed.

3. Conveyor condition monitor as claimed in claim 1 further comprising a second deformation sensor, wherein the first and the second deformation sensors are arranged so as to be positionable symmetrically about the conveyor rail.

4. Conveyor condition monitor as claimed in claim 3, wherein the second deformation sensor is adapted to have a first state and a second state, the first state indicating that a trolley is not deformed and a second state indicating that a trolley is deformed.

5. Conveyor condition monitor as claimed in claim 3, wherein the second deformation sensor comprises at least one of a mechanical sensor, an electrical sensor, a magnetic sensor, a harmonic sensor, and an ultrasonic sensor.

6. Conveyor condition monitor as claimed in claim 3, wherein the second deformation sensor comprises an optical sensor.

7. Conveyor condition monitor as claimed in claim 6, wherein the optical sensor is arranged such that when a trolley is in the second state it interrupts a light beam.

8. Conveyor condition monitor as claimed in claim 7, wherein the optical sensor comprises a light curtain.

9. Conveyor condition monitor as claimed in claim 5, wherein the second deformation sensor comprises a mechanical sensor.

10. Conveyor condition monitor as claimed in claim 9, wherein in a first state, the mechanical sensor is undeflected, and in a second state the mechanical sensor is deflected, the first state indicating that a trolley is not deformed and a second state indicating that a trolley is deformed.

11. Conveyor condition monitor as claimed in claim 9, wherein the mechanical sensor is a moveable arm.

12. Conveyor condition monitor as claimed in claim 9, wherein the moveable arm is mounted rotatably, flexibly, or resiliently.

13. Conveyor condition monitor as claimed in claim 5, wherein the deformation sensor comprises an electrical circuit.

14. Conveyor condition monitor as claimed in claim 13, wherein in a first state, the electrical circuit is unbroken, and in a second state the electrical circuit is broken, the first state indicating that a trolley is not deformed and a second state indicating that a trolley is deformed.

15. Conveyor condition monitor as claimed in claim 5, wherein the second deformation sensor comprises a magnetic field.

16. Conveyor condition monitor as claimed in claim 15, wherein in a first state, the magnetic field is continuous, and in a second state the magnetic field is interrupted, the first state indicating that a trolley is not deformed and a second state indicating that a trolley is deformed.

17. Conveyor condition monitor as claimed in claim 5, wherein the second deformation sensor comprises a harmonic sensor.

18. Conveyor condition monitor as claimed in claim 17, wherein the harmonic sensor is adapted to detect vibrations of wheels of a trolley, among the plurality of trollies.

19. Conveyor condition monitor as claimed in claim 18, wherein in a first state, vibrations of the wheels of a trolley are present, and in a second state the vibrations of the wheels of a trolley are reduced, the first state indicating that a trolley is not deformed and a second state indicating that a trolley is deformed.

20. Conveyor condition monitor as claimed in claim 19, wherein when the trolley is deformed, a trolley wheel is bent, stationary or missing.

21. Conveyor condition monitor as claimed in claim 18, wherein in a first state, vibrations of the wheels of a trolley are present, and in a second state the vibrations of the wheels of a trolley are absent, the first state indicating that a trolley is present and a second state indicating that a trolley is missing.

22. Conveyor condition monitor as claimed in claim 5, wherein the second deformation sensor comprises an ultrasonic sensor.

23. Conveyor condition monitor as claimed in claim 22, wherein the ultrasonic sensor is an ultrasonic transceiver.

24. Conveyor condition monitor as claimed in claim 23, wherein, in a first state, the ultrasonic waves emitted by the ultrasonic transceivers are uninterrupted, in a second state, the ultrasonic waves emitted by the ultrasonic transceivers are interrupted, the first state indicating that a trolley is not deformed and a second state indicating that a trolley is deformed.

25. Conveyor condition monitor as claimed in claim 24, wherein the strength of the reflected signal and/or the time of flight of the reflected signal are used to determine if the ultrasonic waves are interrupted.

26. Conveyor condition monitor as claimed as claim 1, wherein the light source and the detector are arranged along with the conveyor monitoring station on one side of the conveyor trollies and the reflector is arranged on the opposite side of the conveyor trollies.

27. Conveyor condition monitor as claimed in claim 26, wherein the light source and the reflector are arranged such that in the first state, the maximum amount of light emitted by the light source reaches the optical detector, and in the second state a portion of a trolley interrupts the light emitted by the light source, reducing the amount of light reaching the optical detector.

28. Conveyor condition monitor as claimed in claim 1, wherein the light source is a light emitting diode (LED).

29. Conveyor condition monitor as claimed in claim 28, wherein the light emitting diode emits light in the infra-red region of the electromagnetic spectrum.

30. Conveyor condition monitor as claimed in 6, wherein two detectors are provided, and wherein the light source is situated between the two detectors.

31. Conveyor condition monitor as claimed in claim 1, wherein the detector is a photodiode.

32. Conveyor condition monitor as claimed in claim 1, wherein the conveyor monitoring station is adapted to sound an alarm if the deformation sensor is in the second state.

33. Conveyor condition monitor as claimed in claim 1, further comprising an identification device adapted to identify an individual trolley in the conveyor.

34. Conveyor condition monitor as claimed in claim 1, further comprising a marking device adapted to mark an individual trolley in the conveyor.

35. Conveyor condition monitor as claimed in claim 1, further comprising a notification device adapted to send a notification indicating the presence of a deformed trolley in the conveyer.

36. Conveyor condition monitor as claimed in claim 35, wherein the notification includes:
   a unique identifier for the trolley; and
   the position of the trolley in the conveyor.

37. Conveyor condition monitor as claimed in claim 35, wherein the notification is one of: email, SMS message, MMS message, text message, automated voice message and a system notification.

38. Conveyor condition monitor as claimed claim 1, wherein the conveyor is a monorail conveyor.

39. Conveyor condition monitor coupled to a conveyor, the conveyor comprising a plurality of trollies running along a conveyor rail and linked to one another by a chain link system, comprising:
   a deformation sensor comprising a light source, an optical detector configured to detect light from the light source, and a reflector configured to reflect light incident from the light source towards the optical detector; and
   a marking device in communication with the deformation sensor, wherein the deformation sensor is configured to detect a deformed trolley among the plurality of trollies based on an amount of light detected by the optical detector, and wherein the marking device is configured to mark the deformed trolley.

40. Conveyor condition monitor as claimed in claim 1, wherein the first deformation sensor comprises two light sources.

41. Conveyor condition monitor as claimed in claim 1, wherein the first deformation sensor comprises two optical detectors.

42. Conveyor condition monitor as claimed in claim 1, wherein the first deformation sensor comprises two reflectors.

* * * * *